(12) United States Patent
Yang (10) Patent No.: US 12,424,675 B2
(45) Date of Patent: Sep. 23, 2025

(54) BATTERY PACK AND THERMAL RUNAWAY PROTECTION METHOD

(71) Applicant: XIAOMI EV TECHNOLOGY CO., LTD., Beijing (CN)

(72) Inventor: Shuqiang Yang, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 380 days.

(21) Appl. No.: 18/072,488

(22) Filed: Nov. 30, 2022

(65) Prior Publication Data

US 2024/0063458 A1 Feb. 22, 2024

(30) Foreign Application Priority Data

Aug. 16, 2022 (CN) .......................... 202210983529.4

(51) Int. Cl.
*H01M 10/633* (2014.01)
*H01M 10/48* (2006.01)
(Continued)

(52) U.S. Cl.
CPC ....... *H01M 10/633* (2015.04); *H01M 10/486* (2013.01); *H01M 10/613* (2015.04);
(Continued)

(58) Field of Classification Search
CPC ............. H01M 10/633; H01M 10/486; H01M 10/613; H01M 10/6567; H01M 10/658; H01M 50/143; H01M 50/367; H01M 10/482; H01M 50/209; H01M 50/14; H01M 10/625; H01M 10/637; H01M 10/6563;
(Continued)

(56) References Cited

U.S. PATENT DOCUMENTS 8,202,665 B2 * 6/2012 Iritsuki ................. H01M 8/241
429/479
11,462,782 B2 * 10/2022 Lee ..................... H01M 50/249
(Continued)

FOREIGN PATENT DOCUMENTS

CN 111446397 A * 7/2020 ........ H01M 10/6556
CN 111640888 A 9/2020
(Continued)

OTHER PUBLICATIONS

European Patent Application No. 22214918.9, Search and Opinion dated Aug. 29, 2023, 7 pages.
(Continued)

*Primary Examiner* — Kaity V Chandler
(74) *Attorney, Agent, or Firm* — Cozen O'Connor (57) ABSTRACT

A thermal runaway protection method reduces thermal runaway for a battery pack. The battery pack includes: a housing defining a chamber; a cell group located in the chamber and having a pressure relief side; and a cooling component integrated into the housing and configured to cool the cell group in case of a temperature of at least part of the cell group higher than a preset temperature. The pressure relief side is spaced apart from an inner wall of the chamber to define an exhaust passage therebetween, and the exhaust passage is adapted to discharge gas generated by the cell group in case of thermal runaway of the cell group.

19 Claims, 2 Drawing Sheets

(51) Int. Cl.
  *H01M 10/613* (2014.01)
  *H01M 10/6567* (2014.01)
  *H01M 10/658* (2014.01)
  *H01M 50/143* (2021.01)
  *H01M 50/367* (2021.01)

(52) U.S. Cl.
  CPC ..... *H01M 10/6567* (2015.04); *H01M 10/658* (2015.04); *H01M 50/143* (2021.01); *H01M 50/367* (2021.01)

(58) Field of Classification Search
  CPC .. H01M 50/204; H01M 50/24; H01M 50/244; Y02E 60/10
  See application file for complete search history.

(56) References Cited

U.S. PATENT DOCUMENTS

| | | | | |
|---|---|---|---|---|
| 2012/0082875 A1* | 4/2012 | Watanabe | ......... | H01M 10/6563 |
| | | | | 429/82 |
| 2012/0164490 A1* | 6/2012 | Itoi | ..................... | H01M 50/358 |
| | | | | 429/82 |
| 2012/0288738 A1* | 11/2012 | Yasui | .................. | H01M 50/262 |
| | | | | 429/82 |
| 2022/0123427 A1* | 4/2022 | Ren | ...................... | H01M 50/289 |
| 2022/0320651 A1* | 10/2022 | Yang | .................. | H01M 10/625 |

FOREIGN PATENT DOCUMENTS

| | | | | |
|---|---|---|---|---|
| CN | 112787020 A | | 5/2021 | |
| CN | 213717016 U | * | 7/2021 | ............. Y02E 60/10 |
| CN | 216213676 U | * | 4/2022 | .......... H01M 50/291 |
| CN | 114628847 A | | 6/2022 | |
| CN | 114784429 A | * | 7/2022 | ............ H01M 50/24 |
| CN | 217182332 U | * | 8/2022 | ............. Y02E 60/10 |
| CN | 115149202 A | * | 10/2022 | .......... H01M 50/289 |
| CN | 217544813 U | * | 10/2022 | .......... H01M 50/367 |
| CN | 115411425 A | * | 11/2022 | .......... H01M 50/213 |
| WO | WO-2019167612 A1 | * | 9/2019 | .......... H01M 10/052 |
| WO | WO-2020110448 A1 | * | 6/2020 | .......... H01M 10/653 |
| WO | WO-2021022130 A1 | * | 2/2021 | ............. B32B 27/12 |

OTHER PUBLICATIONS

Chinese Patent Application No. 202210983529.4, Office Action dated Jan. 11, 2024, 10 pages.
Chinese Patent Application No. 202210983529.4, English translation of Office Action dated Jan. 11, 2024, 11 pages.

* cited by examiner

BATTERY PACK AND THERMAL RUNAWAY PROTECTION METHOD

CROSS-REFERENCE TO RELATED APPLICATIONS

The present application claims the benefit of priority to Chinese Application No. 202210983529.4, filed on Aug. 16, 2022, the contents of which are incorporated herein by reference in their entireties for all purposes.

FIELD

The present disclosure generally relates to a battery field technology, and more particularly to a battery pack and a thermal runaway protection method for a battery pack.

BACKGROUND

As the power battery is widely used as a power source of new energy vehicles, the safety of the power battery has been concerned by consumers. The intrinsic safety of the power battery is limited by factors such as a temperature resistance of a cell, heat release of the thermal runaway, eruption control and pressure release due to chemical natures of the power battery system. On this basis, thermal runaway protection is provided for the power battery to prevent the temperature of the power battery system from getting out of control. However, the exiting thermal runaway protection is generally a passive protection, and the performance of the thermal runaway protection of the power battery is poor.

SUMMARY

In embodiments of a first aspect of the present disclosure, a battery pack is provided. The battery pack includes a housing defining a chamber; a cell group located in the chamber and having a pressure relief side; and a cooling component integrated into the housing and configured to cool the cell group in case of a temperature of at least part of the cell group higher than a preset temperature. The pressure relief side is spaced apart from an inner wall of the chamber to define an exhaust passage therebetween, and the exhaust passage is adapted to discharge gas generated by the cell group in case of thermal runaway of the cell group.

In embodiments of a second aspect of the present disclosure, a thermal runaway protection method for the battery pack as described in the embodiments of the first aspect is provided. The method includes obtaining basic information and an intrinsic parameter that affect thermal runaway of the battery pack; and performing a thermal runaway development operation according to the basic information and the intrinsic parameter. The thermal runaway development operation includes at least one of an exhaust operation, a thermal insulation operation, an electrical insulation operation, an active liquid cooling operation, and an operation for preventing mutual spraying of cells.

DETAILED DESCRIPTION

Embodiments of the present disclosure are described in detail below, examples of which are illustrated in the drawings. The embodiments described herein with reference to drawings are explanatory, and used to generally understand the present disclosure, but shall not be construed to limit the present disclosure.

Figure 1:
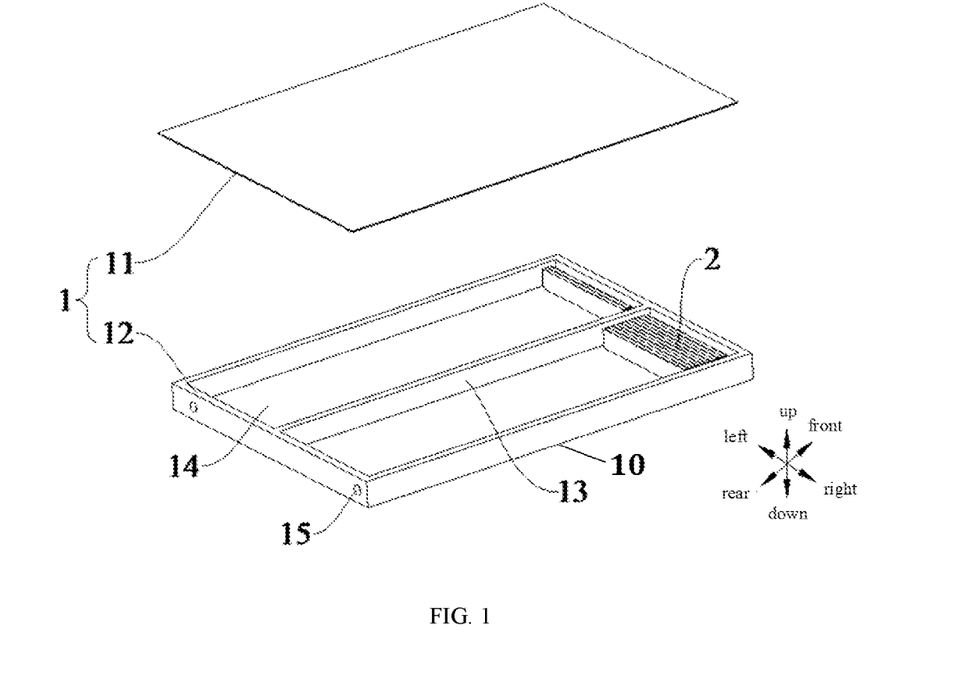
FIG. 1 is an explosion diagram showing a battery pack in accordance with an embodiment of the present disclosure.
Figure 2:
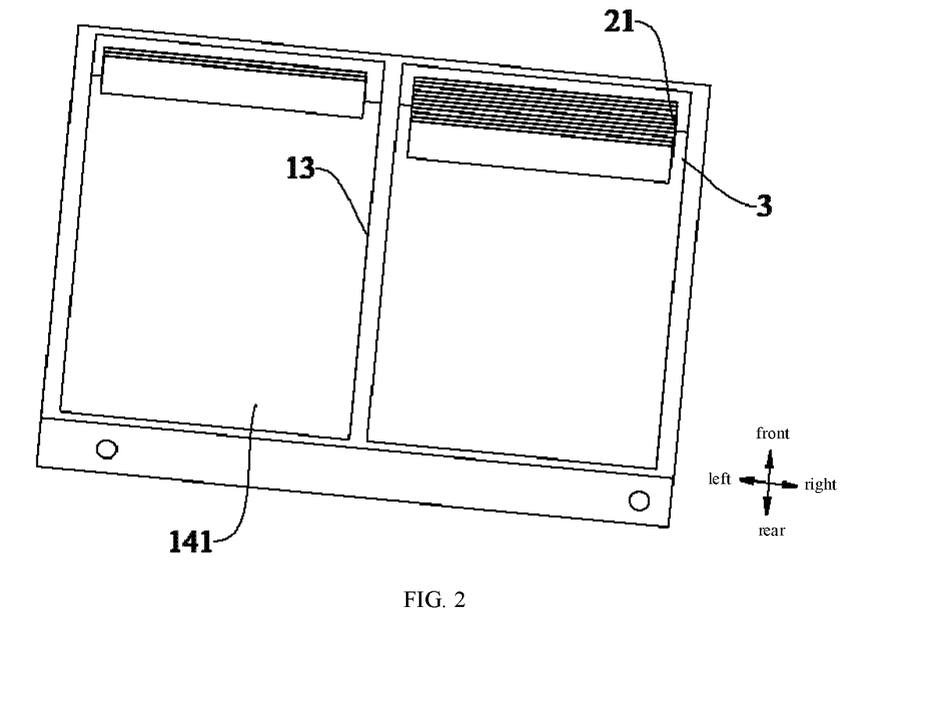
FIG. 2 is a schematic diagram showing a body in FIG. 1.
Figure 3:
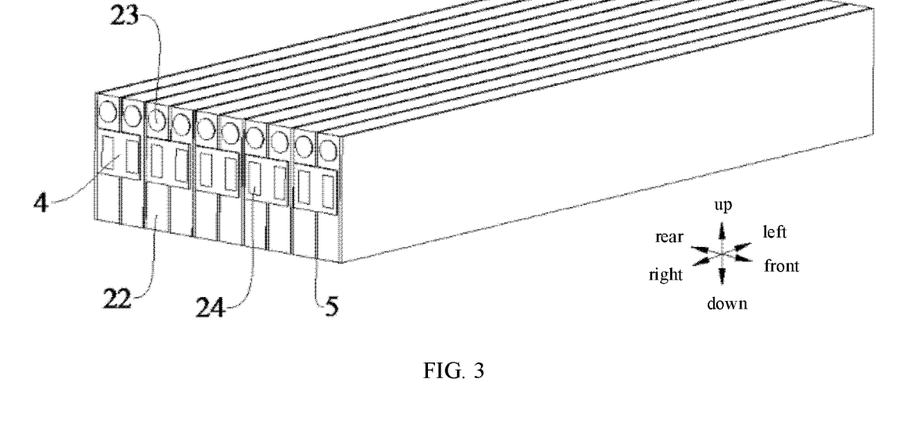
FIG. 3 is a schematic diagram showing a cell in FIG. 1.

As shown in FIG. 1 to FIG. 3, a battery pack in embodiments of the present disclosure includes a housing 1, a cell group 2 and a cooling component 10.

The housing 1 defines a chamber 14. As shown in FIG. 1, the housing 1 may have a cuboid shape and is formed by separate parts. For example, the housing 1 may include two parts, and the housing 1 is formed by splicing/connecting the two parts. A space in the housing 1 forms the chamber 14.

The cell group 2 is located in the chamber 14 and has a pressure relief side 21. The pressure relief side 21 is spaced apart from an inner wall of the chamber 14 to define an exhaust passage 3 therebetween, and the exhaust passage 3 is adapted to discharge gas generated by the cell group 2 in case of thermal runaway of the cell group 2.

For example, a battery module may have one or more the cell groups 2 each including a plurality of cells, and the cells 22 in the cell group 2 may be arranged in parallel and/or in series. The core group 2 may be fixed in the inner chamber 14 of the housing 1. The core group 2 may be provided with a pressure relief valve. In case of the thermal runaway of the cell group, pressure may be relieved through the pressure relief valve. The pressure relief side 21 may be regarded as a side of the core group 2 where the pressure relief valve is arranged. As shown in FIG. 2, the pressure relief side 21 may be a right side of the core group 2.

The pressure relief side 21 of the core group 2 may be spaced apart from the inner wall of the housing 1 at a certain distance. The space between the pressure relief side 21 and the inner wall of the housing 1 forms the exhaust passage 3. In case of thermal runaway of the cell group 2, the gas discharged from the core group 2 may flow through the exhaust passage 3 and be discharged to outside of the housing 1.

The cooling component 10 is integrated into the housing 1, and configured to cool the cell group 2 in case of a temperature of at least part of the cell group 2 higher than a preset temperature. For example, the cooling component 10 may be a water cooling device, and may be integrated at a bottom of the housing 1. Each cell 22 of the cell group 2 may be provided with a protection circuit board configured to monitor the temperature of the respective cell 22 in real time. In a case that thermal runaway of the cell 22 of the cell group 2 happens, that is, the monitored temperature of the cell 22 is higher than the preset temperature, a control device may drive the cooling component 10 to cool the cell group 2 down.

It could be understood that in some embodiments, the cooling component 10 may be an air-cooling component. The temperature of the cell group 2 may be monitored/detected by a temperature sensor.

In the battery pack of the embodiments of the present disclosure, by arranging the exhaust passage 3, the generated gas can be timely discharged to delay the thermal runaway, and by providing the cooling component 10, the high-temperature cell 22 can be cooled down to further avoid the thermal runaway of the cell 22, thus achieving the effects of monitoring the battery pack in real time, early warning and active protection, which reduces the thermal runaway or prevents the thermal runaway form spreading in the battery pack, thereby improving the safety of the battery pack.

In some embodiments, the housing 1 is provided with at least one partition 13 to separate the chamber 14 into a plurality of sub-chambers 141. The battery pack includes a plurality of cell groups 2 located in the plurality of sub-chambers 141 in one-to-one correspondence. Each of the plurality of cell groups 2 is spaced apart from an inner wall of a corresponding sub-chamber 141 to define an exhaust passage 3 therebetween.

For example, as shown in FIG. 1 and FIG. 2, the housing 1 is provided with one partition 13, the partition 13 may be integrated with the housing 1, and the partition 13 may extend in a forward and backward direction. The partition 13 may separate the chamber 14 of the housing 1 into two sub-chambers 141. One of the sub-chamber 141 is located on a left side of the partition 13 and the other of the sub-chamber 141 is located on a right side of the partition 13. Correspondingly, the battery pack may include two cell groups 2, and the two cell groups 2 may be assembled in two sub-chambers 141, respectively.

Each sub-chamber 141 is provided with an independent exhaust passage 3. The exhaust passage 3 on the left side of the sub-chamber 141 may be located between the cell group 2 and the partition 13, and the exhaust passage 3 on the right side of the sub-chamber 141 may be located between the cell group 2 and the inner wall of the housing 1. It should be noted that a surface of the partition 13 may be regarded as a part of the inner wall of the housing 1.

The partition 13 is used for separating the adjacent cells 22. In case of thermal runaway, a conductive solid and liquid substance ejected from the cell 22 may be blocked by the partition 13 to restrain spread of the thermal runaway.

In some embodiments, the partition 13 is provided with a fireproof insulating layer. The fireproof insulating layer is formed of at least one of a mica material and a fireproof rubber material. For example, the fireproof insulating layer may be arranged on a surface of the partition 13, and the fireproof insulating layer may be a mica board, a flexible mica material and the like, which may enhance the fireproof insulating performance and further inhibit the spread of the thermal runaway.

In some embodiments, the cell group 2 includes a plurality of cells 22 arranged in a stack and provided with a plurality of first pressure relief valves 23. The plurality of first pressure relief valves 23 are arranged on the pressure relief side 21. As shown in FIG. 1 to FIG. 3, the plurality of cells 22 in the cell group 2 are stacked and arranged along a front and rear direction. Each cell 22 is provided with a first pressure relief valve 23, and all pressure relief valves 23 on the plurality of cells 22 are arranged on a right side of the cell 22 (i.e., the pressure relief side 21). In case of the thermal runaway of the cell(s) 22, the pressure may be relieved through the first pressure relief valve(s) 23.

In some embodiments, a chamber wall of each sub-chamber 141 is provided with a second pressure relief valve 15 communicated with the exhaust passage 3 and adapted to discharge gas in the exhaust passage 3. As shown in FIG. 1 and FIG. 2, the number of second relief valves 15 may be the same as that of the sub-chambers 141, and the plurality of the second relief valves 15 may be communicated with the exhaust passages 3 for the plurality of the sub-chambers 141 in one-to-one correspondence. Therefore, the gas in the exhaust passage 3 may be discharged to the outside of the housing 1 through the respective second pressure relief valve 15, which may timely relief the pressure of the battery pack and restrain the thermal runaway.

In some embodiments, a thermal insulation layer 5 is arranged between two adjacent cells 22, and the thermal insulation layer 5 is formed of at least one of an aerogel material, a silicone rubber and a silicone foam. For example, as shown in FIG. 3, the thermal insulation layer 5 may be arranged between any two adjacent cells 22 in the cell group 2. In case of thermal runaway of a single cell 22, the thermal insulation layer 5 may be used for thermal insulation to prevent the heat from transferring to the adjacent cells 22, thereby avoiding a wider range thermal diffusion, and further inhibiting the spread of the thermal runaway.

In some embodiments, the battery pack further includes an electrical connector 4. The electrical connector 4 has a first end connected with a pole 24 of a first one of the plurality of cells 22, and a second end connected with a pole 24 of a second one of the plurality of cells 22. A surface of the electrical connector 4 is provided with an electrical insulating layer.

As shown in FIG. 3, the electrical connector 4 may be a rectangular plate, and the two adjacent cells 22 may form a group. The electrical connector 4 is connected to the poles 24 of the two cells 22 in the same group. An external part of the electrical connector 4 is insulated, that is, an electrical insulating layer is arranged on an external surface of the electrical connector 4. For example, a withstand voltage of the electrical insulating layer is not less than 2.7 kV.

In some embodiments, the housing 1 includes a first housing component 11 (i.e., a cover) and a second housing component 12 (i.e., a body). The housing 1 is formed by splicing the first housing component 11 and the second housing component 12. The cooling component 10 is integrated into one of the first housing component 11 and the second housing component 12. Each of the first housing component 11 and the second housing component 12 is provided with an insulating coating. The insulating coating is formed of at least one of an epoxy material and a ceramic material.

As shown in FIG. 1, the housing 1 may include two parts, i.e., the first housing component 11 and the second housing component 12, respectively. The second housing component 12 may have be a square box, and the first housing component 11 may be a plate. A top of the second housing component 12 is opened to form an opening, and the first housing component 11 may be used to seal the opening of the second housing component 12. The first housing component 11 and the second housing component 12 may be connected and fixed to each other for example by means of snap fit, fastener connection and the like.

An external surface of each of the first housing component 11 and the second housing component 12 may be provided with the insulating coating. The insulating coating is used to enhance the electrical protection performance of the battery pack to avoid electric leakage, thereby further improving the safety.

In some embodiments, an inner wall of the exhaust passage 3 is provided with a fireproof flame-retardant layer, and the fireproof flame-retardant layer has a fire-resistance rating not less than 200° C. The fireproof flame-retardant layer may be coated on the inner wall of the exhaust passage 3, which may improve the fire-retardant effect of the exhaust passage 3 and further improve the safety.

In the embodiments of the present disclosure, a thermal runaway protection method is provided, which will be described in detail as follows.

Figure 4:
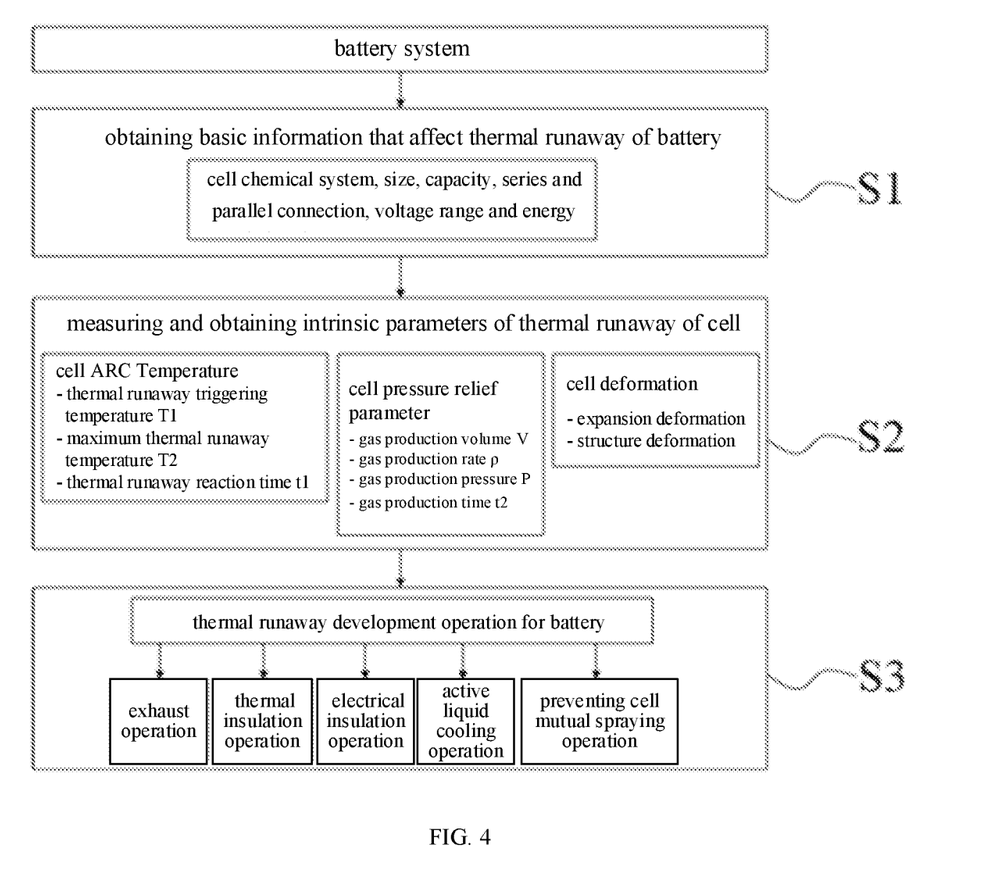
FIG. 4 is a flow chart of a thermal runaway protection method in an embodiment of the present disclosure.

As shown in FIG. 4, the thermal runaway protection method of the embodiments of the present disclosure includes the following operations.

Basic information and an intrinsic parameter that affect thermal runaway of the battery pack are obtained. For example, according to a battery system method, basic information of a battery that affects the thermal runaway development is obtained, and an intrinsic parameter of thermal runaway of the battery is obtained through measurement(s), calculation(s) and the like.

A thermal runaway development operation is performed according to the basic information and the intrinsic parameter. The thermal runaway development operation includes at least one of an exhaust operation, a thermal insulation operation, an electrical insulation operation, an active liquid cooling operation, and an operation for preventing mutual spraying of cells 22. For example, the exhaust operation, the thermal insulation operation, the electrical insulation operation, the active liquid cooling operation, and the operation for preventing mutual spraying of the cells 22 may be determined synchronously according to the basic information and the intrinsic parameter. Alternatively, one or several of the exhaust operation, the thermal insulation operation, the electrical insulation operation, the active liquid cooling operation, and the operation for preventing mutual spraying of the cells 22 may be determined according to the basic information and the intrinsic parameter. In this way, design requirements of the thermal runaway protection of the battery pack may be met.

With the thermal runaway protection method of the embodiments of the present disclosure, a methodology for forward developing and designing of the control of or early warning for the thermal runaway of the battery pack is provided, which provides a support for the thermal runaway protection designs and operations. With the present method, the thermal runaway protection effect of the battery pack is further improved and thus the operation safety is improved.

In some embodiments, as show in FIG. 4, the basic information may include at least one of a cell chemical system, a cell size, a cell capacity, the number of cells, series and parallel connections, a voltage range and a cell energy. The intrinsic parameter may include at least one of a cell temperature parameter, a cell pressure relief parameter and a cell thermal runaway deformation parameter.

In some embodiments, the cell temperature parameter (cell ARC temperature) may include at least one of a cell thermal runaway triggering temperature T1, a maximum cell thermal runaway temperature T2 and a cell thermal runaway reaction time t1.

In some embodiments, the cell pressure relief parameter may include at least one of a gas production volume V, a gas production rate ρ, a gas production pressure P and a gas production time t.

In some embodiments, the cell thermal runaway deformation parameter may include at least one of expansion deformation data and thermal structure deformation data.

In some embodiments, the exhaust operation includes the following operations.

A cross-sectional area A of an exhaust passage 3 is determined according to the number n of cells, the gas production volume V, the gas production rate ρ and the gas production pressure P. For example, during operation, the exhaust passage 3 shall be smooth, that is, there is no blockage in the exhaust passage 3. The cross-sectional area A of the exhaust passage 3 is calculated according to the number n of cells, the gas production volume V, the gas production rate ρ and the gas production pressure P through the following formula:

$$A = f(n, V, \rho, P)$$

Before calculation, a function may be fitted by using the gas production volume V and the gas production rate ρ, the gas production pressure P as independent variables, and the cross-sectional area A as a dependent variable. The specific values of the gas production volume V, the gas production rate ρ and the gas production pressure P may be input into the fitted function to determine the corresponding cross-sectional area A.

In an embodiment, the housing 1 is provided with at least one second pressure relief valve 15, and the exhaust operation includes determining the number of the at least one second pressure relief valve 15 by flow field exhaust simulation. For example, the second pressure relief valve 15 may be a PACK pressure relief valve, and position(s) of and the number of the at least one second pressure relief valve 15 on the housing 1 may be determined through CFD flow field exhaust simulation.

In an embodiment, the housing 1 is provided with the at least one second pressure relief valve 15, and the exhaust operation includes determining an exhaust rate W of the at least one second pressure relief valve 15 according to the number n of cells, the gas production volume V, the gas production rate ρ and the gas production pressure P through the following formula:

$$W = f(n, V, \rho, P)$$

Before calculation, a function may be fitted by using the number n of cells, the gas production volume V, the gas production rate ρ and the gas production pressure P as independent variables, and the exhaust rate W as a dependent variable. The specific values of the number n of cells, the gas production volume V, the gas production rate ρ and the gas production pressure P may be input into the fitted function to determine the corresponding exhaust rate W.

The exhaust operation may include electrically insulating a high-voltage electrical connector in case that the high-voltage electrical connector is located in the exhaust passage 3. That is, an insulation protection layer may be provided outside the high-voltage electrical connector, and the insulation protection layer has a withstand voltage level greater than or equal to 2.7 kV.

The exhaust operation may include performing fireproof flame-retardant operation on an inner wall of the exhaust passage 3. For example, a fireproof material for fireproof operation may be determined according to the maximum temperature T2 after the thermal runaway of the cell. For example, the maximum temperature T2 is 200° C., and thus a fire-resistance rating of the fireproof material is larger than or equal to 200° C.

In some embodiments, the battery pack includes a plurality of cells 22, and a thermal insulation layer 5 is arranged between two adjacent cells 22. The thermal insulation operation includes determining at least one of a type and/or a thickness of the thermal insulation layer 5 according to the maximum cell thermal runaway temperature T2. For example, the type and the thickness of the material of the thermal insulation layer 5 may be positively correlated with the maximum temperature T2 after the thermal runaway of the cell. Specifically, the type and the thickness of the thermal insulation layer 5 may be simulated and optimized by using a thermal simulation process to determine the final type and thickness of the material of the thermal insulation layer 5.

In some embodiments, the thermal insulation layer 5 includes, but not limited to, an aerogel material, a silicone rubber and a silicone foam.

In some embodiments, the insulation operation includes determining a minimum creepage distance and/or a minimum electrical clearance of the battery pack; and/or electrically insulating the housing.

For example, the cells 22 may be connected in series and/or in parallel to form a battery system of 400V platform, 800V platform or other high-voltage platforms. During insulation operation, after the thermal runaway of the cell 22, it is needed to avoid short circuit among the cell and the adjacent cell, the high-voltage connecter (electrical connector 4), the first housing component 11, the second housing component 12 and other conductive elements. Therefore, the insulation operation needs to meet the following requirements.

The minimum creepage distance is the shortest distance obtained between conductive elements in the battery pack. For example, in a case that the 400V platform is formed by the cells connected in series and in parallel, the minimum creepage distance should not be less than 12.7 mm. In a case that the 800V platform is formed by the cells connected in series in and parallel, the minimum creepage distance should not be less than 19.1 mm.

The minimum electrical clearance is the minimum distance obtained between all elements in the battery pack. For example, the 400V platform is formed by the cells connected in series and in parallel, the minimum electrical clearance is not less than 9.5 mm. For another example, the 800V platform is formed by the cells connected in series and in parallel, the minimum electrical clearance is not less than 19.1 mm.

In some embodiments, the active liquid cooling operation includes determining a preset temperature, such as 60° C.; and starting the cooling component to cool the battery pack down to the preset temperature or less in responding to that the temperature of at least part of the battery pack reaches the preset temperature.

In some embodiments, a plurality of cell groups 2 are provided, and the operation for preventing mutual spraying of the cells includes providing a partition 13 between two adjacent cell groups 2. For example, the first pressure relief valves 23 of the cells 22 may face to each other, in this case the thermal runaway happens and the gases discharged from first pressure relief valves 23 may be sprayed to other cells 22. In such a case, a longitudinal beam or other structural elements (such as the partition 13) is provided between the cells to prevent mutual spraying of the cells. The longitudinal beam and other structural members may be provided with a fireproof insulation material including, but not limited to, a mica plate, a flexible mica material, a fireproof rubber material and the like.

Features described above as well as those claimed below may be combined in various ways without departing from the scope hereof. The following enumerated examples illustrate some possible, non-limiting combinations:

(A1) A battery pack includes: a housing defining a chamber; a cell group located in the chamber and having a pressure relief side; and a cooling component integrated into the housing and configured to cool the cell group in case of a temperature of at least part of the cell group higher than a preset temperature. The pressure relief side is spaced apart from an inner wall of the chamber to define an exhaust passage therebetween, and the exhaust passage is adapted to discharge gas generated by the cell group in case of thermal runaway of the cell group.

(A2) In embodiments of the battery pack (A1), the housing is provided with at least one partition to separate the chamber into a plurality of sub-chambers; the battery pack includes a plurality of cell groups located in the plurality of sub-chambers in one-to-one correspondence; each of the plurality of cell groups is spaced apart from an inner wall of a corresponding sub-chamber to define an exhaust passage therebetween.

(A3) In embodiments of the battery pack (A2), the partition is provided with a fireproof insulating layer formed of at least one of a mica material and a fireproof rubber material.

(A4) In embodiments of the battery pack (A2) or (A3), the cell group includes a plurality of cells that are arranged in a stack and provided with a plurality of first pressure relief valves, respectively, the plurality of first pressure relief valves being arranged on the pressure relief side; and/or a chamber wall of each sub-chamber is provided with a second pressure relief valve communicated with the exhaust passage and adapted to discharge gas in the exhaust passage.

(A5) In embodiments of the battery pack (A4), a thermal insulation layer is arranged between two adjacent cells, and formed of at least one of an aerogel material, a silicone rubber and a silicone foam.

(A6) In embodiments of the battery pack (A4) or (A5), the battery pack further includes: an electrical connector having a first end connected with a pole of a first one of the plurality of cells, and a second end connected with a pole of a second one of the plurality of cells, a surface of the electrical connector being provided with an electrical insulating layer.

(A7) In embodiments of any one of the battery packs (A1) to (A6), the housing includes a cover and a body spliced with the cover to form the housing; and the cooling component is integrated into one of the cover and the body. Each of the cover and the body is provided with an insulating coating formed of at least one of an epoxy material and a ceramic material.

(A8) In embodiments of any one of the battery packs (A1) to (A7), an inner wall of the exhaust passage is provided with a fireproof flame-retardant layer with a fire-resistance rating not less than 200° C.

(B1) A thermal runaway protection method for any one of the battery packs (A1) to (A8) includes: obtaining basic information and an intrinsic parameter that affect thermal runaway of the battery pack; performing a thermal runaway development operation according to the basic information and the intrinsic parameter. The thermal runaway development operation includes at least one of an exhaust operation, a thermal insulation operation, an electrical insulation operation, an active liquid cooling operation, and an operation for preventing mutual spraying of cells.

(B2) In embodiments of the thermal runaway protection method (B1), the basic information includes at least one of a cell chemical system, a cell size, a cell capacity, the number of cells, series and parallel connections and a voltage range; and/or the intrinsic parameter includes at least one of a cell temperature parameter, a cell pressure relief parameter and a cell thermal runaway deformation parameter; the cell temperature parameter includes at least one of a cell thermal runaway triggering temperature, a maximum cell thermal runaway temperature and a cell thermal runaway reaction time; the cell pressure relief parameter includes at least one of a gas production volume, a gas production rate, a gas production pressure and a gas production time; and the cell thermal runaway deformation parameter includes at least one of expansion deformation data and thermal structure deformation data.

(B3) In embodiments of the thermal runaway protection method (B2), the exhaust operation includes: determining a cross-sectional area of an exhaust passage according to the number of cells, the gas production volume, the gas production rate and the gas production pressure; and/or determining the number of at least one second pressure relief valve by flow field exhaust simulation, in case that the housing is provided with the at least one second pressure relief valve; and/or determining an exhaust rate of the at least one second pressure relief valve according to the number of cells, the gas production volume, the gas production rate and the gas production pressure, in case that the housing is provided with at least one second pressure relief valve; and/or electrically insulating a high-voltage electrical connector in case that the high-voltage electrical connector is located in the exhaust passage; and/or performing fireproof flame-retardant operation on an inner wall of the exhaust passage.

(B4) In embodiments of the thermal runaway protection method (B2) or (B3), the battery pack includes a plurality of cells, and a thermal insulation layer is arranged between two adjacent cells; the thermal insulation operation includes: determining at least one of a type and a thickness of the thermal insulation layer according to the maximum cell thermal runaway temperature.

(B5) In embodiments of any one of the thermal runaway protection methods (B2) to (B4), the insulation operation includes: determining a minimum creepage distance and/or a minimum electrical clearance of the battery pack; and/or electrically insulating the housing.

(B6) In embodiments of any one of the thermal runaway protection methods (B2) to (B5), the active liquid cooling operation includes: determining a preset temperature; and starting the cooling component to cool the battery pack down to the preset temperature or less in response to that the temperature of at least part of the battery pack reaches the preset temperature.

(B7) In embodiments of any one of the thermal runaway protection methods (B2) to (B6), a plurality of cell groups are provided, and the operation for preventing mutual spraying of cells includes providing a partition between two adjacent cell groups.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise" "axial," "radial," and "circumferential" should be construed to refer to the orientation as shown in the drawings under discussion. These relative terms are for convenience of description and do not require that the present disclosure be constructed or operated in a particular orientation, and thus cannot be construed to limit the present disclosure.

In addition, terms such as "first" and "second" are used herein for the purpose of description and are not intended to indicate or imply relative importance or to imply the number of indicated technical features. Thus, the feature defined with "first" and "second" may include one or more of this feature. In the description of the present disclosure, "a plurality of" means two or more than two, unless specified otherwise.

In the present disclosure, unless specified or limited otherwise, the terms "mounted," "connected," "coupled," "fixed," and the like are used broadly, and may be, for example, fixed connections, detachable connections, or integral connections; may also be mechanical or electrical connections; may also be direct connections or indirect connections via intervening structures; and may also be inner communications of two elements, which can be understood by those skilled in the art according to specific situations.

In the description of the present disclosure, "first feature" or "second feature" may include one or more of the feature. A structure in which the first feature is "above" or "under" the second feature may include an embodiment where the first feature and the second feature are in direct contact, and may also include an embodiment where the first feature and the second feature are not in direct contact but are in contact through another feature between them. A structure in which the first feature is "above", "over" or "on" the second feature includes an embodiment where the first feature is directly above and obliquely above the second feature, or simply means that the first feature is at a height larger than the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above-mentioned expressions throughout this specification are not necessarily referring to the same embodiment or example of the present disclosure. Furthermore, the particular features, structures, materials, or characteristics may be combined in any suitable manner in one or more embodiments or examples. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, modifications and deformation can be made in the embodiments without departing from spirit, principles and scope of the present disclosure.

What is claimed is:

1. A battery pack, comprising:
   a housing defining a chamber;
   a cell group located in the chamber and having a pressure relief side; and
   a cooling component integrated into the housing and configured to cool the cell group in case of a temperature of at least part of the cell group higher than a preset temperature;
   wherein the pressure relief side is spaced apart from an inner wall of the chamber to define an exhaust passage therebetween, and the exhaust passage is adapted to discharge gas generated by the cell group in case of thermal runaway of the cell group;
   wherein the housing is provided with at least one partition to separate the chamber into a plurality of sub-chambers;

the battery pack comprises a plurality of cell groups located in the plurality of sub-chambers in one-to-one correspondence;

each of the plurality of cell groups is spaced apart from an inner wall of a corresponding sub-chamber to define an exhaust passage therebetween.

2. The battery pack according to claim 1, wherein the partition is provided with a fireproof insulating layer formed of at least one of a mica material and a fireproof rubber material.

3. The battery pack according to claim 1, wherein at least one of:

the cell group comprises a plurality of cells that are arranged in a stack and provided with a plurality of first pressure relief valves, respectively, the plurality of first pressure relief valves being arranged on the pressure relief side; and a chamber wall of each sub-chamber is provided with a second pressure relief valve communicated with the exhaust passage and adapted to discharge gas in the exhaust passage.

4. The battery pack according to claim 3, wherein a thermal insulation layer is arranged between two adjacent cells, and formed of at least one of an aerogel material, a silicone rubber and a silicone foam.

5. The battery pack according to claim 3, further comprising:

an electrical connector having a first end connected with a pole of a first one of the plurality of cells, and a second end connected with a pole of a second one of the plurality of cells, a surface of the electrical connector being provided with an electrical insulating layer.

6. The battery pack according to claim 5, wherein the electrical insulating layer has a withstand voltage level greater than or equal to 2.7 kV.

7. The battery pack according to claim 1, wherein the housing comprises a cover and a body spliced with the cover to form the housing; and the cooling component is integrated into one of the cover and the body.

8. The battery pack according to claim 7, wherein each of the cover and the body is provided with an insulating coating formed of at least one of an epoxy material and a ceramic material.

9. The battery pack according to claim 1, wherein an inner wall of the exhaust passage is provided with a fireproof flame-retardant layer with a fire-resistance rating not less than 200° C.

10. A thermal runaway protection method for the battery pack according to claim 1, comprising:

obtaining basic information and an intrinsic parameter that affect thermal runaway of the battery pack;

performing a thermal runaway development operation according to the basic information and the intrinsic parameter;

wherein the thermal runaway development operation comprises at least one of an exhaust operation, a thermal insulation operation, an electrical insulation operation, an active liquid cooling operation, and an operation for preventing mutual spraying of cells.

11. The thermal runaway protection method according to claim 10, wherein at least one of:

the basic information comprises at least one of a cell chemical system, a cell size, a cell capacity, a number of cells, series and parallel connections and a voltage range; and the intrinsic parameter comprises at least one of a cell temperature parameter, a cell pressure relief parameter and a cell thermal runaway deformation parameter;

the cell temperature parameter comprises at least one of a cell thermal runaway triggering temperature, a maximum cell thermal runaway temperature and a cell thermal runaway reaction time;

the cell pressure relief parameter comprises at least one of a gas production volume, a gas production rate, a gas production pressure and a gas production time; and the cell thermal runaway deformation parameter comprises at least one of expansion deformation data and thermal structure deformation data.

12. The thermal runaway protection method according to claim 11, wherein the exhaust operation comprises at least one of:

determining a cross-sectional area of an exhaust passage according to the number of cells, the gas production volume, the gas production rate and the gas production pressure;

determining a number of at least one second pressure relief valve by flow field exhaust simulation, in case that the housing is provided with the at least one second pressure relief valve;

determining an exhaust rate of the at least one second pressure relief valve according to the number of cells, the gas production volume, the gas production rate and the gas production pressure, in case that the housing is provided with at least one second pressure relief valve;

electrically insulating a high-voltage electrical connector in case that the high-voltage electrical connector is located in the exhaust passage; and performing fireproof flame-retardant operation on an inner wall of the exhaust passage.

13. The thermal runaway protection method according to claim 11, wherein the battery pack comprises a plurality of cells, and a thermal insulation layer is arranged between two adjacent cells;

the thermal insulation operation comprises:

determining at least one of a type and a thickness of the thermal insulation layer according to the maximum cell thermal runaway temperature.

14. The thermal runaway protection method according to claim 11, wherein the insulation operation comprises at least one of:

determining at least one of a minimum creepage distance and a minimum electrical clearance of the battery pack; and electrically insulating the housing.

15. The thermal runaway protection method according to claim 14, wherein a 400V battery pack has the minimum creepage distance of greater than or equal to 12.7 mm, and the minimum electrical clearance of greater than or equal to 9.5 mm.

16. The thermal runaway protection method according to claim 14, wherein a 800V battery pack has the minimum creepage distance of greater than or equal to 19.1 mm, and the minimum electrical clearance of greater than or equal to 19.1 mm.

17. The thermal runaway protection method according to claim 11, wherein the active liquid cooling operation comprises:

determining a preset temperature; and starting the cooling component to cool the battery pack down to the preset temperature or less in response to that the temperature of at least part of the battery pack reaches the preset temperature.

18. The thermal runaway protection method according to claim 17, wherein the preset temperature is 60° C.

19. The thermal runaway protection method according to claim 11, wherein a plurality of cell groups are provided, and the operation for preventing mutual spraying of cells comprises providing a partition between two adjacent cell groups.

* * * * *